(12) United States Patent
Bichler

(10) Patent No.: US 9,945,504 B2
(45) Date of Patent: Apr. 17, 2018

(54) LINING ELEMENT FOR THE REHABILITATION OF A PIPELINE

(71) Applicant: Trelleborg Pipe Seals Duisburg GmbH, Duisburg (DE)

(72) Inventor: Andreas Bichler, Ebbs/Tirol (AT)

(73) Assignee: Trelleborg Pipe Seals Duisburg GmbH, Duisburg (DE)

( * ) Notice: Subject to any disclaimer, the term of this patent is extended or adjusted under 35 U.S.C. 154(b) by 221 days.

(21) Appl. No.: 14/305,802

(22) Filed: Jun. 16, 2014

(65) Prior Publication Data

US 2015/0176745 A1 Jun. 25, 2015

(30) Foreign Application Priority Data

Dec. 20, 2013 (DE) .................. 10 2013 114 630

(51) Int. Cl.
| | |
|---|---|
| *F16L 55/16* | (2006.01) |
| *F16L 55/165* | (2006.01) |
| *F16L 55/179* | (2006.01) |
| *B32B 5/02* | (2006.01) |
| *B32B 5/26* | (2006.01) |

(Continued)

(52) U.S. Cl.
CPC .......... *F16L 55/165* (2013.01); *B32B 5/022* (2013.01); *B32B 5/26* (2013.01); *F16L 55/1656* (2013.01); *F16L 55/179* (2013.01); *B29C 63/34* (2013.01); *B29K 2023/04* (2013.01); *B29K 2027/06* (2013.01); *B29K 2075/00* (2013.01); *B29K 2267/00* (2013.01); *B29K 2309/08* (2013.01); *B29L 2023/006* (2013.01); *B32B 2255/02* (2013.01); *B32B 2255/26* (2013.01); *B32B 2262/0276* (2013.01); *B32B 2262/101* (2013.01); *B32B 2307/726* (2013.01); *B32B 2307/7246* (2013.01); *B32B 2597/00* (2013.01); *F16L 55/1651* (2013.01)

(58) Field of Classification Search
USPC ................. 138/97, 98; 405/150.1, 184.2
See application file for complete search history.

(56) References Cited

U.S. PATENT DOCUMENTS

| | | | | |
|---|---|---|---|---|
| 5,411,060 A | * | 5/1995 | Chandler | ............... B29C 63/34 138/103 |
| 5,535,786 A | * | 7/1996 | Makela | .................... D04B 1/14 138/98 |

(Continued)

FOREIGN PATENT DOCUMENTS

| | | |
|---|---|---|
| DE | 19718655 | 11/1998 |
| DE | 202010017654 U1 | 6/2012 |

(Continued)

*Primary Examiner* — James Hook
(74) *Attorney, Agent, or Firm* — Lee & Hayes, PLLC

(57) ABSTRACT

The invention relates to a lining element (10) for the rehabilitation of a pipeline, having a carrier layer (16) consisting of an expandable, resin-absorbent material which, in the longitudinal direction ($L_1$, $L_2$) of the carrier layer (16), has a first expansion rigidity, and a stiffening structure (24) which, in the longitudinal direction ($L_1$, $L_2$) of the carrier layer (16), has a second expansion rigidity, wherein the first expansion rigidity is lower than the second expansion rigidity and wherein the stiffening structure (24) is incorporated into the carrier layer (16).

20 Claims, 1 Drawing Sheet

(51) Int. Cl.
   *B29C 63/34* (2006.01)
   *B29K 27/06* (2006.01)
   *B29K 75/00* (2006.01)
   *B29K 267/00* (2006.01)
   *B29K 309/08* (2006.01)
   *B29L 23/00* (2006.01)

(56) References Cited

U.S. PATENT DOCUMENTS

| | | | | |
|---|---|---|---|---|
| 5,546,992 A * | 8/1996 | Chick | | F16L 9/18 138/104 |
| 5,671,778 A * | 9/1997 | Sakuragi | | B29C 63/0013 138/125 |
| 6,360,780 B1 * | 3/2002 | Adolphs | | F16L 55/1656 138/130 |
| 6,708,729 B1 * | 3/2004 | Smith | | F16L 55/1656 138/124 |
| 6,779,563 B2 * | 8/2004 | Schwert | | D04C 1/02 138/97 |
| 2002/0124898 A1 * | 9/2002 | Renaud | | F16L 55/1656 138/98 |
| 2003/0113489 A1 | 6/2003 | Smith | | |
| 2005/0028881 A1 * | 2/2005 | Smith | | F16L 55/1656 138/98 |
| 2008/0277012 A1 * | 11/2008 | Anders | | F16L 55/1651 138/98 |
| 2008/0277013 A1 * | 11/2008 | Anders | | F16L 55/1651 138/98 |
| 2011/0083766 A1 * | 4/2011 | Anders | | F16L 55/1651 138/98 |

FOREIGN PATENT DOCUMENTS

WO    WO01/81805    11/2001
WO    WO2011104357 A2    9/2011

* cited by examiner

LINING ELEMENT FOR THE REHABILITATION OF A PIPELINE

This Application claims priority to DE Patent Application No. 10 2013 114 630.9, filed Dec. 20, 2013, which is incorporated herein by reference.

The present invention relates to a lining element for the rehabilitation of a pipeline. The lining element may, inter alia, also be used for the rehabilitation of a connection region between a main pipeline and a lateral pipeline. The invention further relates to a method for manufacturing a lining element of this type.

Lining elements of this type are employed in the rehabilitation of pipelines, in particular of main pipe lines and lateral pipelines, in the sewerage sector and also in the building sector. In particular, leaking and defective portions of pipelines and, in particular, of regions of pipeline connectors can be rehabilitated by introducing the lining elements. To this end, by providing the lining element with an adhesive, the lining element is permanently connected to the inner wall of the pipe to be rehabilitated, a curable resin, in particular, being used as an adhesive.

The lining element comprises a carrier layer consisting of resin-absorbent material. Prior to the introduction of the lining element, the layer of resin-absorbent material is impregnated with the resin, and the lining element is then finally positioned at the location to be rehabilitated by means of a rehabilitation device. Here, in particular, the inversion methods (eversion methods), which are known, are employed. Once the resin has cured, the lining element bears against the inner wall of the pipe in a form-fitting and force-fitting manner.

Accordingly, a lining element which has a layer of resin-absorbent material and a plastic film is non-woven material and/or a knitted spacer material is/are used as the resin-absorbent material. The plastic film is produced from PVC or from thermoplastic polyurethane.

A lining element which comprises a layer of resin-absorbent textile material, a coating of an artificial resin and, optionally, a lamination or coating of a foam material is furthermore disclosed in DE 20 2010 017 654 U1. The resin-absorbent layer is formed using a non-woven material, a fabric and a knitted good containing ECR glass fibres, optionally in a mixture with synthetic fibres. The coating formed using an artificial resin is composed of polyurethane, polyvinyl chloride, polyacrylate or polyolefin.

A calibration hose, which is usually inflated by means of vapour, is used for inversing, pressing on and/or curing the lining element within the pipeline. It is necessary here, inter alia, to leave the calibration hose in the inflated state for a relatively long period of time.

In order to achieve an optimal installation result, it is necessary that the lining element expands only slightly in the longitudinal direction of the pipe during [inversing, pressing and/or curing], so as to have a sufficient thickness also in the region of changes in the nominal width, elbows or bends.

It is, therefore, an object of the invention to provide a lining element which, during inversing, pressing and/or curing, has an improved dimensional stability in the longitudinal direction of the pipe.

To achieve the object, a lining element according to Claim 1 and a method for manufacturing a lining element of this type according to Claim 18 are proposed.

Advantageous embodiments of the lining element according to the invention and of the method according to the invention are disclosed in the dependent claims.

All "lining elements" mentioned in the present invention may also be referred to as liner rehabilitation element, pipe lining element or inversion liner. In principle, a lining element of this type can be configured in one part or in multiple parts. Furthermore, the lining element may have a main-pipe portion and a lateral-pipe portion, the latter being inversed into the lateral pipe.

The lining element according to the invention according to Claim 1 serves to rehabilitate a pipeline. It may also be used, inter alia, for rehabilitating a connection region, which is also referred to as a junction, between a main pipeline and a lateral pipeline. The lining element comprises a carrier layer of an expandable, resin-absorbent material which, in the longitudinal direction of the carrier layer, has a first expansion rigidity, and a stiffening structure which, in the longitudinal direction of the carrier layer, has a second expansion rigidity. The first expansion rigidity is lower than the second expansion rigidity. The stiffening structure is incorporated into the carrier layer.

Since the expansion rigidity of the carrier layer is lower than the expansion rigidity of the stiffening structure, an expansion of the lining element, in particular of the carrier layer, in its longitudinal direction or the longitudinal direction of the pipe is reduced or limited during inversing, pressing on and/or curing. The stiffening structure can furthermore completely preclude the expansion of the lining element in the longitudinal direction of the pipe. On account of this, the lining element according to the invention has a high dimensional stability in the longitudinal direction of the pipe. At the same time, the stiffening structure can permit an expansion of the lining element in the direction of the inner wall of the pipe, i.e. in the radial direction, during inversing, pressing and/or curing. Since the stiffening structure is incorporated into the carrier layer, a prestressing can be introduced into the carrier layer, such that an expansion of the lining element in the longitudinal direction of the pipe can be limited and/or prevented.

In a preferred embodiment, the stiffening structure is incorporated into the carrier layer by needle-punching, needling and/or interweaving. The stiffening structure may preferably be connected to the carrier layer in a material-locking, force-fitting and/or form-fitting manner.

Within the scope of the present invention, the stiffening structure can also be referred to as reinforcing structure or prestressing structure.

In an advantageous embodiment, the stiffening structure is connected to the carrier layer in a force-fitting manner. The stiffening structure is preferably needle-punched into the carrier layer.

In a preferred embodiment, the stiffening structure is configured in such a manner that the expansion rigidity is unchanged in the direction which is transverse to the longitudinal direction, preferably in the direction of the thickness of the carrier layer. This makes it possible for the lining element to be pressed against the inner wall of the pipe during inversing, pressing and/or curing, in order to rehabilitate the leaking and defective portion in this manner. Expandability in the radial direction furthermore makes it possible for the lining element to be adapted as well as possible to the profile of the pipeline, in particular with respect to elbows and bends in the pipeline. In addition, expandability in the radial direction prevents the forming of folds in the region of elbows and bends in the pipeline.

The stiffening structure can be formed using at least one stiffening element. Furthermore, the stiffening element may be formed using a thread, a tape, a layer, a plate and/or a strip. Stiffening elements of this type can be advantageously connected to or incorporated into the carrier layer. Stiffening elements of this type are furthermore available as cost-effective commodities.

In an advantageous embodiment, the stiffening element is formed using a multiplicity of threads, which extend in the longitudinal direction of the carrier layer. The multiplicity of threads advantageously provides for a uniform prestressing to be introduced into the carrier layer, in order to thereby limit or prevent an expansion of the carrier layer in the longitudinal direction of the pipe. The threads are preferably incorporated into the carrier layer.

Furthermore preferably, the threads are at a distance from one another of between approx. 2 mm and approx. 5 cm, preferably between approx. 10 mm and 4 cm. The threads are advantageously arranged or incorporated within the carrier layer so as to be at equidistant distances from one another. Furthermore advantageously, the threads are incorporated into the carrier layer in such a manner that all threads are at an identical distance from the outer side of the carrier layer.

The at least one thread, or the plurality of threads, may advantageously extend across the entire length of the lining element. Furthermore, the threads may also be incorporated into portions of the lining element.

In a preferred embodiment, the at least one thread has a fineness of between approx. 50 dtex and approx. 2500 dtex, preferably between approx. 500 dtex and approx. 1500 dtex. A thread of such thickness can introduce a sufficiently high prestressing into the carrier layer and, on account of this, limit and/or prevent an expansion of the lining element in the longitudinal direction of the pipe.

The at least one thread is preferably produced from polyester, glass fibre, aramid and/or Kevlar. Threads of this type are available by the meter as cost-effective products.

The carrier layer can furthermore be formed using at least two interconnected layers. The two layers here may be interconnected in a force-fitting and/or material-locking manner. The material-locking connection preferably takes place by means of adhesive bonding or laminating.

The at least one thread is furthermore advantageously arranged in the border region of the two layers. The border region may also be referred to as transition zone or butt joint within the scope of the present invention. The at least one thread, or the plurality of threads, here is/are preferably incorporated into an outer side of one of the layers. Furthermore preferably, one thread and/or a plurality of threads may be incorporated into the two layers, in particular into the mutually adjoining outer sides of the two layers.

In an advantageous embodiment, the carrier layer is formed using a fibre material, wherein the at least one thread is incorporated, preferably needle-punched, into the carrier layer. Initially, two layers of non-woven material are preferably produced for manufacturing the carrier layer by needling together or interweaving the fibre material in a known manner. The layers here may be of different thickness or of the same thickness. One thread or a multiplicity of threads is/are preferably incorporated into at least one outer side of one of the layers when the two layers of non-woven material are being connected, such that the thread or the threads is/are arranged in the border region of the two layers. The at least one thread or the plurality of threads is/are advantageously needle-punched into the layer, in particular into an outer side. Furthermore, the thread or the threads can initially be incorporated, preferably needle-punched, into one of the layers, in particular into an outer side, and subsequently the two layers of non-woven material are interconnected, preferably needled together, in such a manner that the thread or the threads is/are arranged in the border region of the two layers.

In an advantageous embodiment, the carrier layer is formed using a non-woven material of ECR glass fibres. In a further advantageous embodiment, the carrier layer is formed using a non-woven material, wherein the non-woven material has a mixture of ECR glass fibres and synthetic fibres, preferably polyester fibres. ECR glass fibres are preferably fibres having an increased resistance to corrosion (ECR: E-glass corrosion resistant). The ECR glass fibres and the synthetic fibres, preferably the polyester fibres, are preferably needled together. Furthermore, other glass fibres or other fibres may also be used. Alternatively or additionally, the carrier layer may comprise polyester fibres, polypropylene fibres, carbon fibres and/or aramid fibres. In principle, it is possible to also use needled polyester non-woven material, glass non-woven material and thermoplastic artificial fibres, for example PP, PES, carbon fibres or aramid fibres, or combinations of the aforementioned components. On account of its fibre-like construction, the carrier layer can be impregnated with a resin, in particular with an epoxy resin. The carrier layer is particularly advantageously configured as a multi-knit material. A multi-knit carrier layer, in particular, makes it possible to achieve a good radial expandability.

In a preferred embodiment, the mixing ratio of ECR glass fibres to polyester fibres is in the range between approx. 90% by weight ECR glass fibres and approx. 10% by weight polyester fibres up to between approx. 10% by weight ECR glass fibres and approx. 90% by weight polyester fibres, preferably in the range between approx. 85% by weight ECR glass fibres and approx. 15% by weight polyester fibres up to between approx. 15% by weight ECR glass fibres and approx. 85% by weight polyester fibres.

The carrier layer advantageously has a thickness between approx. 2 mm and approx. 6 mm, preferably between approx. 3 mm and approx. 5 mm, wherein the carrier layer preferably has an area weight between approx. 300 g/m$^2$ and approx. 1000 g/m$^2$, preferably between approx. 400 g/m$^2$ and approx. 900 g/m$^2$. The carrier layer preferably has a thickness of approx. 3 mm. In another advantageous embodiment, the lining element has a thickness of approx. 5 mm. Furthermore, the area weight may preferably be between approx. 500 g/m$^2$ and approx. 800 g/m$^2$.

In a further embodiment, the carrier layer is provided with a coating consisting of plastic, preferably of polyvinyl chloride (PVC), polyethylene (PE) or polyurethane, furthermore preferably of thermoplastic polyurethane (TPU), wherein the coating preferably has an area weight between approx. 100 g/m$^2$ and approx. 200 g/m$^2$, preferably approx. 150 g/m$^2$. The coating is advantageously configured to be fluid-tight and provides for any washout of the resin to be prevented during inversing, pressing and/or curing. The coating furthermore forms a protection layer against damage and/or abrasion by the materials conveyed along with the waste water or rain water. Furthermore, said coating can serve as a protection layer against chemical reactions of the waste water and/or of the materials conveyed. In the installed state of the lining element, the coating advantageously points towards the inside of the pipe. In a preferred embodiment, the coating is connected to the carrier layer by means of an adhesive layer. The coating is preferably directly connected to the carrier layer, i.e. without an intermediate layer. The coating is furthermore preferably laminated onto the carrier layer. Moreover, the coating may be connected to the carrier layer by means of a calender. The adhesive layer preferably faces towards the carrier layer and serves as a connection between the coating and the carrier layer.

In an advantageous embodiment, the coating may comprise a fluid-tight barrier-layer system formed by a plurality of layers. The layers are preferably individual thin layers. The thin layers are furthermore preferably configured as thin plastic layers, which are interconnected in a material-locking manner. The thin plastic layers are advantageously formed using thermoplastic polyurethane preferably having different degrees of hardness (different Shore hardnesses). The barrier-layer system advantageously provides for the vapour pressure required within the lining element for inversing, pressing and/or curing to be retained, since the coating system has a high impermeability to vapour. In this manner, a calibration hose can be dispensed with. The plurality of layers preferably serve as a resin-barrier layer and/or a vapour-barrier layer. In a preferred embodiment, the barrier-layer system has a sliding layer, which serves as an installation aid. The sliding layer here may be provided with a wave-shaped surface structure having elevations and/or depressions. In the installed state of the lining element, the sliding layer bears against the inner wall of the pipe.

In a preferred embodiment, the carrier layer may be provided with a layer of foam material. The layer of foam material here may be connected to the carrier layer by means of an adhesive layer or by laminating. The layer of foam material is preferably an open-cell or open-pore foam material. The at least one layer of foam material is advantageously also actively impregnated with the resin at least in part during impregnation of the lining element. The resin is deposited in the pores of the foam-material structure. Once the lining element is subsequently brought to the location to be rehabilitated and is connected to the inner wall of the pipe as intended, the lining element is pressed against the inner wall of the pipe. The structure of the pores is modified in this process. The pores, which previously were approximately circular in shape, become elongate or elliptic as a result of pressing together on account of which the resin can also migrate to neighbouring pores which initially had not yet completely been filled with resin. In this state of the lining element pressed against the inner wall of the pipe, further pores are thus filled with resin. The resin then conglutinates the pore structures and forms a substantially fluid-tight protection layer.

The method according to the invention for manufacturing a lining element according to the invention comprises the following steps. First, a carrier layer of an expandable, resin-absorbent material which, in the longitudinal direction of the carrier layer, has a first expansion rigidity, is provided. Subsequently, a stiffening structure is incorporated into the carrier layer, wherein the stiffening structure, in the longitudinal direction of the carrier layer, has a second expansion rigidity, which is greater than the first expansion rigidity.

Since the expansion rigidity of the carrier layer is lower than the expansion rigidity of the stiffening structure, a prestressing can be introduced into the carrier layer by incorporation of the stiffening structure, such that an expansion of the lining element in the longitudinal direction can be limited and/or prevented. The stiffening structure is advantageously connected to the carrier layer in a material-locking, force-fitting and/or form-fitting manner. The stiffening structure can reduce or limit expansion of the lining element, in particular of the carrier layer, in its longitudinal direction, or in the longitudinal direction of the pipe, during inversing, pressing and/or curing. The stiffening structure preferably completely precludes the expansion of the lining element in the longitudinal direction of the pipe. On account of this, the lining element according to the invention has a high dimensional stability in the longitudinal direction of the pipe. At the same time, the stiffening structure may permit an expansion of the lining element in the direction of the inner wall of the pipe, that is to say in the radial direction, during inversing, pressing and/or curing.

In an advantageous embodiment, the carrier layer is formed using a fibre material, wherein the stiffening structure is connected to the carrier layer in a force-fitting manner. The stiffening structure is preferably needle-punched into the carrier layer. The stiffening structure is furthermore preferably needle-punched into one outer side of the carrier layer. For manufacturing the carrier layer, the fibre material is needled together in a known manner. The carrier layer is preferably formed using a non-woven material. The non-woven material is advantageously formed using ECR glass fibres, which are preferably needled together in a known manner. The non-woven material furthermore preferably comprises a mixture of ECR glass fibres and synthetic fibres, preferably polyester fibres, which are furthermore preferably needled together in a known manner. The mixing ratio of ECR glass fibres to polyester fibres is advantageously in the range between approx. 90% by weight ECR glass fibres and approx. 10% by weight polyester fibres up to between approx. 10% by weight ECR glass fibres and approx. 90% by weight polyester fibres, preferably in the range between approx. 85% by weight ECR glass fibres and approx. 15% by weight polyester fibres up to between approx. 15% by weight ECR glass fibres and approx. 85% by weight polyester fibres.

The carrier layer is preferably formed using at least two interconnected layers. The interconnected layers may be of different thickness or have the same thickness. The two layers may be interconnected in a material-locking, force-fitting and/or form-fitting manner. The two layers are preferably needled together.

In an advantageous embodiment, the layers are interconnected, preferably needled together, wherein the stiffening structure is incorporated, preferably needle-punched, into one of the layers when the two layers are being connected. The stiffening structure is preferably incorporated into one of the layers in such a manner that said stiffening structure is arranged in a border region of the two layers. The stiffening structure is preferably incorporated into an outer side of one of the layers. A stiffening structure may be furthermore preferably incorporated into both layers, in particular into the mutually adjoining outer sides of the two layers. In addition, the stiffening structure may also be incorporated into one of the layers, preferably into one of the outer sides of the layers, prior to the two layers being connected.

The stiffening structure may be formed using at least one stiffening element. The stiffening element may furthermore be formed using a thread, a tape, a layer, a plate and/or a strip. The stiffening element is preferably formed using a multiplicity of threads, which extend in the longitudinal direction of the carrier layer. Stiffening elements of this type can advantageously be connected to, or incorporated into, the carrier layer. The threads, in particular, provide for a uniform prestressing to be introduced into the carrier layer, in order to limit or prevent an expansion of the carrier layer in the longitudinal direction in this manner.

A method for the rehabilitation of a pipeline and/or of a connection region between a main pipeline and a lateral pipeline by means of the lining element according to the invention may be carried out as follows. First, the lining element, in particular the carrier layer and/or the layer of foam material, is/are impregnated with a resin, in particular an epoxy resin. In the case of rehabilitation of an opening region, the lining element has a main-pipe portion and a lateral-pipe portion. The lining element is subsequently introduced into a calibrating hose in a known manner. Subsequently, the lining element is brought to the location to be rehabilitated by means of a rehabilitation device. Once the rehabilitation device has been positioned at the location to be rehabilitated, pressure is applied to the interior of the calibrating hose, on account of which the lining element, with its carrier layer, is pressed against the inner wall of the pipeline, or is inversed into a lateral pipe, respectively. Subsequent to pressing on or inversing, the pressure within the calibrating hose can be reduced to allow the material of the lining element to relax. This reduced pressure is referred to as curing pressure and is between approx. 0.25 bar and 0.5 bar, and thus is slightly below the inversion pressure. The curing pressure is sustained over a certain period of time until the resin has cured and the lining element bears against the inner wall of the pipeline in a form-fitting and force-fitting manner.

In the following, the lining element according to the invention is explained in more detail with reference to the appended drawings, in which, in a schematic manner:

Figure 1:
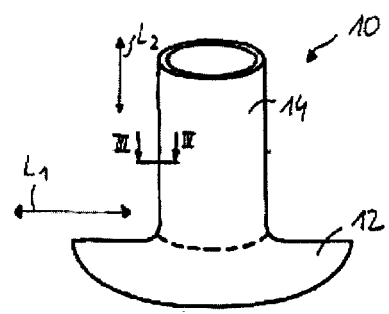
FIG. 1 shows a perspective view of a first lining element according to the invention in the installed state in a pipeline (not illustrated)

In FIG. 1, a first lining element 10 according to the invention is shown in the installed state. The lining element 10 serves for rehabilitating a pipeline (not illustrated), in particular an opening region between a main pipeline and a lateral pipeline, and, in the installed state, bears against the inner wall of the pipeline.

The lining element 10 has approximately a hat shape, and has a main-pipe portion 12 and a lateral-pipe portion 14 which are interconnected. The main-pipe portion 12 here extends in a first longitudinal direction $L_1$, or in the longitudinal direction of the main pipeline, and the lateral-pipe portion 14 extends in a second longitudinal direction $L_2$, or in the longitudinal direction of the lateral pipeline.

Figure 2:
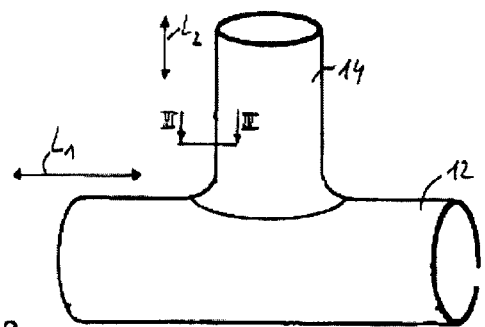
FIG. 2 shows a perspective view of a second lining element according to the invention in the installed state in a pipeline (not illustrated)

In FIG. 2, a second embodiment of a lining element 40 according to the invention, which differs from the first embodiment in that the lining element 40 is configured in approximately a T-shape, and in that the main-pipe portion 12 is configured in a pipe shape, is illustrated in the installed state. The main-pipe portion 12 of the lining element 40 extends in a first longitudinal direction $L_1$, or in the longitudinal direction of the main pipeline, and the lateral-pipe portion 14 of the lining element 40 extends in a second longitudinal direction $L_2$, or in the longitudinal direction of the lateral pipeline.

Figure 3:
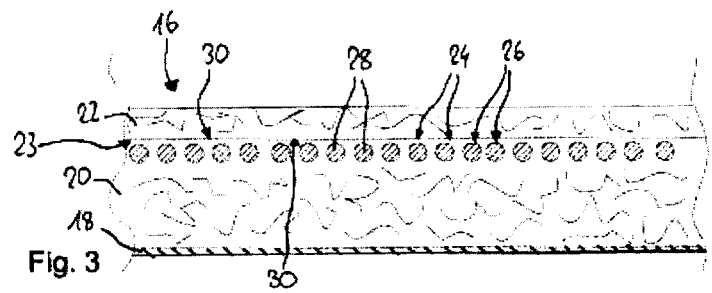
FIG. 3 shows an enlarged detail of a cross section along the line III-III in FIGS. 1 and 2.

As is evident in FIG. 3, both lining elements 10, 40 according to the invention have a carrier layer 16 consisting of an expandable, resin-absorbent material, and a coating 18, which is connected to the carrier layer 16. The carrier layer 16, in its present form, is preferably formed using a first layer 20, consisting of a fibre material, and a second layer 22, consisting of a fibre material. The two layers 20, 22 are advantageously formed using a multiplicity of interwoven ECR glass fibres and/or polyester fibres. The first layer 20, in its present form, is of a greater thickness than the second layer 22, it also being conceivable for the second layer 22 to be of a greater thickness than the first layer 20, or for both layers 20, 22 to be of the same thickness. The fibres of the carrier layer, in particular, have a fineness of between approx. 20 dtex and approx. 50 dtex. The two layers 20, 22 are fixedly interconnected, in particular adhesively connected to one another and/or needled together, on their outer sides 30, and here configure a border region 23.

Furthermore, the carrier layer 16, in particular the first layer 20, is provided with a stiffening structure 24. The stiffening structure 24 is formed using a stiffening element 26 which, in its present form, is formed by a multiplicity of threads 28 arranged beside one another and arranged at uniform distances from one another within the carrier layer 16. The threads 28 here extend in the longitudinal direction $L_1$, $L_2$ of the portions 12, 14, in particular across the entire length of the portions 12, 14. The threads 28 are introduced, in particular needle-punched, into the region of the outer side 30 of the first layer 20. On account of this, the threads 28 are arranged in the border region of the two connected layers 20, 22. For manufacturing the carrier layer 16 using the threads 28, first the two layers 20, 22 are produced and subsequently needled together, the threads 28 being incorporated, in particular needle-punched, into one of the two layers 20, 22 at the same time.

The threads 28, in their respective longitudinal directions $L_1$, $L_2$, have a greater expansion rigidity than the carrier layer 16. On account of this, the threads 28 introduce a prestressing into the carrier layer 16, such that an expansion in the longitudinal direction of the pipe is limited or prevented during inversing, pressing and/or curing. At the same time, the threads 28 allow expansion of the carrier layer 16 in the radial direction, i.e. in the direction of the inner wall of the pipe, during inversing, pressing and/or curing. The threads 28 thus provide for a high dimensional stability of the lining element 10 in the longitudinal direction $L_1$, $L_2$, or in the longitudinal direction of the pipe, of the respective portions 12, 14.

The threads 28 are preferably arranged at equidistant distances from one another within the carrier layer 18, the threads preferably being at a distance from one another which is between approx. 2 mm and approx. 5 cm, preferably between approx. 10 mm and approx. 4 cm. The threads 28 furthermore have a fineness which is between approx. 50 dtex and approx. 2500 dtex, preferably between approx. 500 dtex and approx. 1500 dtex. The threads 28 are furthermore preferably produced from polyester, glass fibre, aramid and/or Kevlar.

In both lining elements 10, 40 according to the invention, in the present form, the threads 28 are introduced into both the main-pipe portion 12 and also the lateral-pipe portion 14. It is furthermore also conceivable for the threads 28 to be introduced into only one of the portions 12, 14. Instead of a multiplicity of threads 28, it is furthermore also possible for only one thread 28 to be introduced into the carrier layer 16. Moreover, the stiffening element 26 may also be configured as a tape, a layer, a plate and/or a strip.

As is evident in FIG. 3, the first layer 20 is provided with a coating 18 which, in the installed state, points towards the interior of the pipe. The coating 18 is advantageously formed using plastic, preferably polyvinyl chloride, polyethylene, polyurethane, furthermore preferably using thermoplastic polyurethane. Furthermore, the coating 18 preferably has an area weight between approx. 100 g/m² and approx. 200 g/m², preferably approx. 150 g/m². The coating 18 prevents a washout of the resin introduced into the carrier layer 16. In addition, the coating 18 in the installed state also serves as a protection layer against abrasion and/or damage by the materials conveyed with the waste water or rain water. It further serves as a chemical protection layer against chemical reactions of the waste water and/or the materials being conveyed. The coating 18 may furthermore also be formed using a coating system which has a plurality of interconnected layers. The coating 18 may be connected to the carrier layer 16 by means of an adhesive layer (not illustrated). The coating 18 may furthermore also be laminated onto the carrier layer 16.

In the following, a method for manufacturing the lining elements 10 according to the invention is explained. First, the layers 20, 22 of the carrier layer are produced by needling together or interweaving the fibres, in particular the ECR glass fibres and/or polyester fibres, in a known manner. Subsequently thereto, the two layers 20, 22 are fixedly interconnected, in particularly needled together, on their outer sides 30, wherein the threads 28 is incorporated, preferably needle-punched, into one of the layers 20, 22, preferably into an outer side 30 of one of the layers 20, 22, at the same time.

The lining elements 10 illustrated in FIGS. 1 and 2 are distinguished by the stiffening structure 24 introduced into the carrier layer 16, or the stiffening element 26 in the form of a multiplicity of threads 28 extending per se in the longitudinal direction $L_1$, $L_2$ of the portions 12, 14. The threads 28 prevent an expansion of the lining portions 12, 14 in their longitudinal directions $L_1$, $L_2$, or in the longitudinal direction of the pipe, during [inversing, pressing and/or curing of] the lining element 10, 40. The threads 28 furthermore enable an expansion of the carrier layer 16 in the radial direction, i.e. in the direction of the inner wall of the pipe, for the purpose of rehabilitating the pipeline. Furthermore, the threads 28 may be introduced into both portions 12, 14, or into merely one of them.

LIST OF REFERENCE SIGNS

10 first lining element according to the invention
12 main-pipe portion
14 lateral-pipe portion
18 carrier layer
20 coating
22 first layer
23 second layer
23 border region
24 stiffening structure
26 stiffening element
28 thread
30 outer side
40 second lining element according to the invention
$L_1$ longitudinal direction of the main-pipe portion
$L_2$ longitudinal direction of the lateral-pipe portion

The invention claimed is:
1. A lining element for the rehabilitation of a pipeline, having a carrier layer of an expandable, resin-absorbent material which, in the longitudinal direction of the carrier layer, has a first expansion rigidity, and a stiffening structure which, in the longitudinal direction of the carrier layer, has a second expansion rigidity, wherein the first expansion rigidity is lower than the second expansion rigidity and wherein the stiffening structure is incorporated into the carrier layer,
wherein the stiffening structure is configured in such a manner that the expansion rigidity is unchanged in the direction transverse to the longitudinal direction, and wherein the stiffening structure is formed of at least one stiffening element, and the stiffening element is formed using one or more threads extending in the longitudinal direction of the carrier layer, wherein at least one of the one or more threads has a fineness of between approximately 50 dtex and approximately 2500 dtex.

2. The lining element according to claim 1, wherein the stiffening structure is connected to the carrier layer in a force-fitting manner.

3. The lining element according to claim 1, wherein the stiffening element further includes at least one of tape, a layer, a plate and/or a strip.

4. The lining element according to claim 1, wherein a distance between a first thread of the one or more threads and a second thread of the one or more threads, adjacent to the first thread, is between approx. 2 mm and approx. 5 cm.

5. The lining element according to claim 1, wherein the stiffening element is formed using at least one thread and the at least one thread is produced from polyester, glass fiber, aramid and/or Kevlar.

6. The lining element according claim 1, wherein the carrier layer is formed using at least two interconnected layers.

7. The lining element according to claim 6, wherein at least one thread is arranged in a border region of the two layers.

8. The lining element according to claim 7, wherein the carrier layer is formed using a fiber material, wherein the at least one thread is incorporated, preferably needle-punched, into the carrier layer.

9. The lining element according to claim 8, wherein the carrier layer is formed using a non-woven material of ECR glass fibers.

10. The lining element according to claim 1, wherein the carrier layer is formed using a non-woven material, and wherein the non-woven material has a mixture of ECR glass fibers and synthetic fibers, preferably polyester fibers.

11. The lining element according to claim 10, wherein the mixing ratio of ECR glass fibers to polyester fibers is in the range between approx. 90% by weight ECR glass fibers and approx. 10% by weight polyester fibers up to between approx. 10% by weight ECR glass fibers and approx. 90% by weight polyester fibers.

12. The lining element according to claim 1, wherein the carrier layer has a thickness between approx. 2 mm and approx. 6 mm and wherein the carrier layer has an area weight between approx. 300 g/m2 and approx. 1000 g/m2.

13. The lining element according to claim 1, wherein the carrier layer is provided with a plastic coating and the coating has an area weight between approx. 100 g/m2 and approx. 200 g/m2.

14. A method for manufacturing a lining element according to claim 1, comprising the following steps:
providing a carrier layer of an expandable, resin-absorbent material which, in the longitudinal direction of the carrier layer, has a first expansion rigidity; and
incorporating a stiffening structure into the carrier layer, wherein the stiffening structure, in the longitudinal direction of the carrier layer, has a second expansion rigidity, which is greater than the first expansion rigidity.

15. The method according to claim 14, wherein the carrier layer is formed using a fiber material and the incorporating the stiffening structure into the carrier layer comprises force-fitting the stiffening structure into the carrier layer.

16. The method according to claim 14, wherein the carrier layer is formed using at least two interconnected layers.

17. The method according to claim 16, wherein the interconnected layers are needled together, and the stiffening structure is incorporated into one of the layers when the two layers are being connected.

18. The lining element according to claim 1, wherein the plastic coating comprises at least one of polyvinyl chloride, polyethylene, polyurethane, or thermoplastic polyurethane.

19. The lining element according to claim 1, wherein the one or more threads comprise a plurality of spaced-apart, substantially parallel threads extending along the longitudinal direction of the carrier layer.

20. The lining element according to claim 1, wherein the one or more threads are needle-punched into the carrier layer.

\* \* \* \* \*